United States Patent [19]

Browning

[11] 4,445,950

[45] May 1, 1984

[54] METHOD FOR PREPARING ARTISTIC WORKS WITH YARN

[75] Inventor: Andrea Browning, Orlando, Fla.

[73] Assignee: Evelyn Thilmony, Orlando, Fla. ; a part interest

[21] Appl. No.: 405,617

[22] Filed: Aug. 5, 1982

[51] Int. Cl.³ .................. B32B 5/08

[52] U.S. Cl. .................. 156/63; 156/92; 206/575; 428/39; 428/542.6; 434/83

[58] Field of Search .................. 428/16, 24, 39, 542.2, 428/542.6; 156/63, 92; 434/83; 206/575

[56] References Cited

U.S. PATENT DOCUMENTS

| | | | |
|---|---|---|---|
| 1,061,804 | 5/1913 | Bannan | 428/16 X |
| 1,185,245 | 5/1916 | Sadtler | 112/266.1 X |
| 1,956,594 | 5/1934 | Rindskopf | 428/57 |
| 2,728,149 | 12/1955 | Radt | 428/542.6 X |
| 3,240,176 | 3/1966 | Morrison | 156/72 X |
| 3,425,889 | 2/1969 | Willits, Jr. | 428/904.4 X |
| 3,570,435 | 3/1971 | Morrison | 428/39 X |
| 3,649,400 | 3/1972 | Sawaki et al. | 156/62.2 X |
| 3,815,264 | 6/1974 | Mack | 428/16 X |
| 4,083,740 | 4/1978 | Hamanaka | 428/40 X |
| 4,110,138 | 8/1978 | Nomura et al. | 428/542.2 X |
| 4,189,857 | 2/1980 | Fujisawa | 28/912.2 X |
| 4,202,569 | 5/1980 | Thuringer | 428/542.2 X |
| 4,355,722 | 10/1982 | Lemmeyer | 156/63 X |

FOREIGN PATENT DOCUMENTS

| | | | |
|---|---|---|---|
| 797589 | 7/1958 | United Kingdom | 428/16 |
| 2041835 | 9/1980 | United Kingdom | 156/63 |
| 2065568 | 7/1981 | United Kingdom | 434/83 |

*Primary Examiner*—Henry F. Epstein

*Attorney, Agent, or Firm*—Duckworth, Allen, Dyer & Pettis

[57] ABSTRACT

A method of making an artistic picture or design with strands of yarn. A flat yieldable substrate has the outline of various elements of a picture or design on a painted background and which may have the colored yarn to be used indicated within each outlined portion. The steps of the method includes cutting a length of yarn of the selected color, doubling the yarn, and piercing the doubled end with a straight pin which is pushed into the substrate at a selected point on design. In one technique, the doubled yarn is loosely twisted and a pin inserted through the two strands about one inch from the point of beginning. The length between the pins is formed into an upstanding loop by pushing the pin into the substrate immediately adjacent the first pin. This process is repeated until the entire area is covered with upstanding loops of yarn thereby forming an interesting texture over the area. The remainder of the areas are then similarly covered with appropriate colors of yarn. In some instances, a second layer may be placed over the first layer using the same or contrasting colored yarn in which a length of the selected color is doubled and pinned to one border of an area. The doubled strands are maintained parallel and pinned to the opposite border creating a straight, doubled strand of yarn across the first layer. This process is continued with parallel doubled strands until the entire area is covered with a second layer. The straight strands give a simulated brush stroke effect. Interesting effects can be achieved by pulling a contrasting lower layer of loops through a second layer; by pinning short pieces of yarn through the first layer and to the substrate and brushing to form a fuzzy effect; by trimming brushed yarn to produce a fur-like effect; and by bordering covered areas with twisted strands of yarn.

11 Claims, 10 Drawing Figures

METHOD FOR PREPARING ARTISTIC WORKS WITH YARN

BACKGROUND OF THE INVENTION

1. Field of the Invention

The present invention relates to a method for preparing an artistic work from strands of yarn and more particularly to the method of attaching strands of yarn to a substrate in a predetermined pattern and colors.

2. Description of the Prior Art

Methods of using yarn to produce colorful pictures, designs, and the like are well known and are utilized to make rugs, wall hangings, furniture covers, and similar useful or decorative items. Generally, the known methods involve the use of tools such as needles, hooks, looms, etc. Most of these require a certain level of skill or dexterity on the part of the person doing the work.

This type of artistic work is widely used for therapy and as a hobby for elderly and confined people as well as for the general public. Many kits are available at craft shops for this purpose. However, many persons find the dexterity required and the movements required beyond their skills or abilities.

U.S. Pat. No. 3,240,176 to Morrison discloses a substrate having a multiplicity of holes into which yarn is driven to simulate needlepoint embroidery. Thus, a specially prepared substrate and suitable tools are required. Sadtler teaches, in U.S. Pat. No. 1,185,245, a smocking process having a substrate with a plurality of holes adapted to receive a fabric.

There is a need for a method of attaching yarn to a substrate without tools and without a specially prepared substrate for producing artistic pictures and designs with colored yarn.

SUMMARY OF THE INVENTION

My invention is a method of making an artistic picture or design with strands of yarn which does not require a high level of skill or special tools. A preferred substrate may be formed from a panel of Celotex® or similar material. The basic requirement is that the substrate be soft enough to be penetrated with straight pins yet firm enough to hold the pins in place. Thus, materials such as cork, dense polystyrene and the like are suitable materials.

I refer to my process as "painting with yarn" in that elements of the desired picture are built up with application of various colored yarns to the substrate in a manner that provides delineation of various forms in a raised pattern having a somewhat three-dimensional effect. For example, if a flower were to be shown, its petals would be covered with appropriately colored yarns to indicate the hue and shade desired for each petal. Similarly, the stems and leaves would utilize different colored yarns to obtain the desired realism and/or artistic effect. As will be described in more detail hereinafter, the yarns are applied in some instances to indicate texture such as simulated brush strokes, bark, grass, or other such surface characteristics. The background of the picture may also be formed from yarn in accordance with my method or may be painted with watercolor, oil, acrylics or other media. In using a painted background, an attractive contrast is formed with respect to the portion of the picture produced by the colored yarns.

Assuming for purposes of explanation that a painted background is to be used. In such case, a panel of suitable material such as Celotex® may be prepared by coating the panel with the desired background color. Although a solid color is appropriate in many instances, the background could also show a sky, clouds or other features if desired. After coating of the substrate panel, the design to be produced in yarn may be drawn on the substrate in pencil or with a fine artist brush, outlining each area which is to be of a different color or texture. As may be recognized, the pattern will somewhat resemble embroidery and needlework patterns, paint by number patterns and the like.

There are a number of suitable yarns which are commonly available. However, for the best three-dimensional effect, I prefer the loosely woven wool yarns which generally consist of two to four strands of wool tightly twisted to form a length of yarn. Some yarns may have a relatively smooth surface while others may be quite loose and fluffy. As will be described, the use of a bulky yarn having four strands will result in one effect while the tighter woven two strand yarn may provide other effects.

To apply the yarn to the pattern on the substrate panel, a length of yarn is cut from a hank to a convenient length which may be, for example, two feet. The yarn is doubled and loosely twisted. The yarn will be attached to the substrate by means of common straight pins. Such pins are available in various lengths. I prefer a pin of about one-half in length which may be used with half inch to three quarter inch substrates without projecting through to the other side when inserted. A pin is inserted through the yarn at the end of the loop formed from doubling back the yarn. The two double backed strands are then loosely twisted together. The pin is then inserted into the substrate along the edge of the area selected for starting. The pin is pushed down into the substrate until it is essentially flush. A thimble may be used for this operation. Next, the loosely twisted yarn is dressed along the border of the area being covered. A second pin is pushed through a few filaments of the strands of the twisted yarn. At this point, the loosely twisted yarn is doubled back adjacent to the first pin which action causes the yarn to form an upward directed bow. Next, a third pin is inserted about an inch from the second pin through the strands of the loosely twisted yarn. The inch of yarn is looped and pinned to the substrate adjacent the first pin. This action is contined until the entire area is covered with the selected color yarn. When the two ends of the loosely twisted yarn is reached, the ends may be trimmed with scissors and a new loop formed and spliced at the end of the first loosely twisted strands. The objective of the above described procedure is to cover each discrete marked off area of the pattern with a first layer of a selected color yarn which, due to the slight bowing between points of attachment to the substrate by means of the pins, will give a soft, thick appearance. After all of the marked off areas have been appropriately covered with the selected colors of yarn, an attractive, colorful picture will have been obtained.

Although a single layer picture may be satisfactory in many cases, I generally prefer to build up a second layer of yarn over the first layer in order to produce a number of pleasing effects and a greater thickness or three-dimensional effect.

As will be determined by the designer of the picture, the second layer may be formed in a similar fashion to the first layer but with the strands being placed and formed to resemble paint brush strokes which is accomplished by doubling the yarn but not twisting it as previously described. Here, each pinned section, when an area is completed, will appear as a brush stroke with the strands oriented to give this effect.

Certain areas of the pictures can be differentiated from other areas by combining bulky yearn and standard yarn; by stripping strands off of the yarn to form very small yarn strips which are particularly suited for outlining purposes; by pulling the lower yarn through the upper yarn where different colors have been used to obtain a speckled or spotted effect; by such techniques as brushing to fluff up the yarn and by trimming yarn to produce a fur-like effect.

The method of my invention is particularly suitable for the production of kits in which an artist provides the pattern printed on a substrate and instructions as to the colors, styles, and techniques of applying the yarn to the different areas of the picture. Thus, with such kits, persons with little or no artistic ability can, with no tools, produce very attractive and entertaining pictures with my method. On the other hand, persons with artistic talent may develop fascinating and interesting variations from the printed patterns. I have found that shut-ins, children in hospitals, elderly people, and other such persons quickly can master the simple method of my invention and find great satisfaction and enjoyment from producing colorful and attractive pictures with readily available materials at low cost.

It is therefore a principal object of my invention to provide a method for producing pictures and designs from colored yarns on a substrate.

It is another object of my invention to provide a method using readily available materials in which pictures, patterns, and designs can be produced having a three-dimensional effect.

It is still another object of my invention to provide a method which utilizes a sustrate having a pattern provided thereon in which various portions of the pattern may be covered with yarn held in place by pins pushed into the substrate.

It is yet another object of my invention to provide a method for producing yarn paintings in which the yarn simulates brush strokes.

It is a further object of my invention to provide a method of yarn painting which can be performed by unskilled persons without the use of tools other than a thimble.

It is still a further object of my invention to provide a method for producing artistic pictures formed from yarn which lends itself to the manufacture and sale of kits having specially printed panels, yarn and pins with easy to follow directions.

It is yet a further object of my invention to provide a method for producing paintings with yarn which produces a three-dimensional surface which can be manipulated so as to produce special surface effects such as fur, tree bark, and similar effects.

These and other objects and advantages of my invention will become apparent from the following detailed description when read in conjunction with the drawings.

DETAILED DESCRIPTION OF THE PREFERRED EMBODIMENT

My method for "painting with yarn" will be explained with reference to a typical example, that of producing a picture of a flower on a painted background. However, it will be apparent that the techniques and method described are applicable to many other types of pictures and designs such as those in which the entire panel will be covered with yarn.

Figure 1:
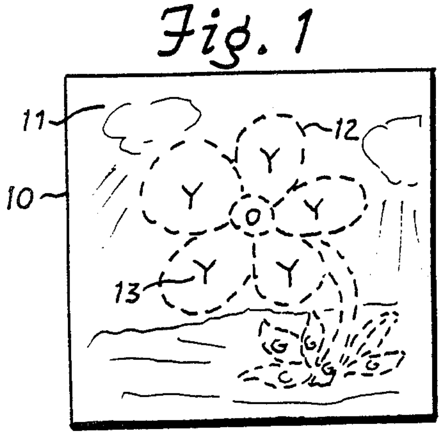
FIG. 1 is a plan view of the face of a panel used as the substrate for an exemplary description of my method of painting with yarn.

Referring first to FIG. 1, a blank panel or substrate 10 is shown. The material of the panel is preferably of a firm yet yieldable material into which straight pins may be pressed and which will tightly grip the pins to prevent dislodgment thereof. Therefore, materials such as insulation board sold under the trade name Celotex ® is particularly well suited for use as panel 10 since it is low cost and easy to handle. A board having a thickness of one half inch is convenient.

The entire board may be painted to form a background 11 which, for example, could be light blue to represent the sky or could be any color which would set off the final design. After the background 11 has been painted, the outline 12 of the design is applied which delineates each area to which yarn is to be applied. Key letters or numbers 13 may be applied within the borders of the various areas to indicate the color and/or type of yarn to be applied. My invention contemplates the production and sale of handicraft kits having preprepared boards or panels 10 and preprinted outlines 12. In such case, instruction pamphlets would be provided which would explain the type of yarn, patterns, twists, texture, and so forth to be used with each area of the design, such variations being explained more fully below. Where the person is artistic and wishes to create his or her own original yarn paintings, the many variations in yarn and techniques available in accordance with my method for applying the yarn will permit full rein to the individual's artistic and creative talents.

Figure 2:
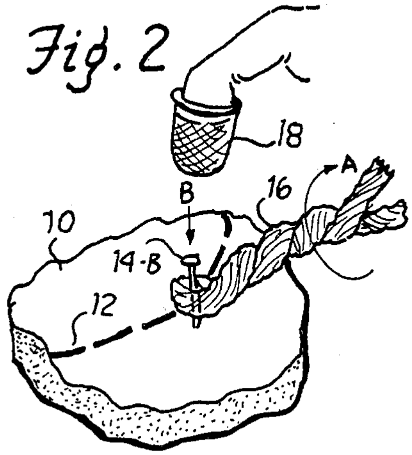
FIG. 2 is a partial portion of the panel of FIG. 1 in a perspective view showing the starting of covering a portion of the pattern with yarn.

After the panel 10 is completed or available, the operator may begin applying yarn to the indicated sections. FIG. 2 is a partial perspective view of an area of panel 10 showing an outline 12 which may correspond to one of the petals of the flower design shown in FIG. 1. A length of yarn 16 is selected in the desired color. In this case, key letter 13 is a Y indicating a yellow yarn 16. The length of yarn selected is arbitrary, depending on the size of the area to be covered. For a reasonably large area, a length of about two feet is convenient. The yarn is first doubled and the two ends twisted together as indicated by arrow A. As will be discussed later, the twist may be clockwise or counterclockwise with opposite twists being used for adjacent areas on occasion to produce a different appearance between the two areas. As shown in FIG. 2, yarn 16 is twisted clockwise. The twist can be either tight or loose as desired for the finished texture. In accordance with a preferred embodiment of my method, I cover an area with a first layer of yarn and, after the first layer is in place, add a second layer thereby producing a thicker more attractive surface. For the first layer, in many cases, a fairly tight twist is desired to form a good backing for the second layer.

After twisting of the yarn 16, a straight pin 14 is pushed through the yarn at the point of doubling and inserted into substrate 10 at a convenient point normally along the border of the space to be covered 12. For comfort and control, it is preferable that the operator utilize a thimble 18 to press the pin 14 into the board as indicated by arrow B. The pins such as pin 14 use to practice my method may be of any desired type, although I prefer a standard steel pin of the type used by dressmakers and the like having a small steel head. For use, with a one half inch thick substrate 10, a half inch pin is suitable and will not project through the back of the substrate 10.

Figure 3:
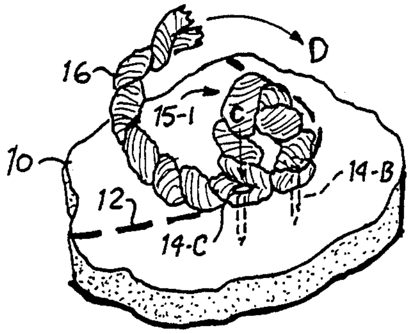
FIG. 3 is a portion of the section of FIG. 2 to an enlarged scale showing forming of a projecting loop as the first step in the covering of the pattern with yarn.
Figure 4:
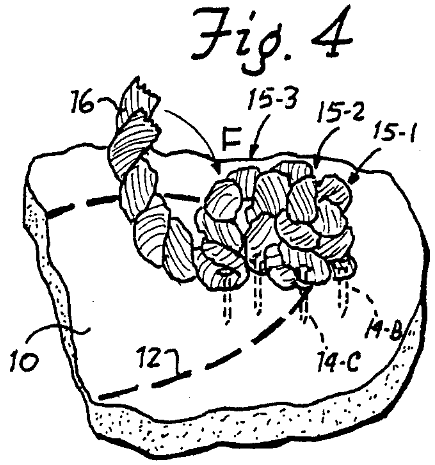
FIG. 4 is a view of the portion of FIG. 3 showing the forming of additional loops of yarn in accordance with the method of the invention.

Having secured the end of the first length of yarn 16, the yarn is doubled over the head of pin 14 as indicated in an enlarged section of the view of FIG. 3 such that the first pin designated here as 14-B is hidden and the yarn 16 is placed along the outline 12 and a second pin 14 inserted through both of the twisted strands 16 into the substrate 10 as indicated by arrow C. Due to the folding over of the yarn 16 and the pinning down by pin 14 at C immediately adjacent pin 14-B, the portion between pin 14-B and 14-C will bow upward forming bow 15-1 which will give the finished covering a three-dimensional characteristic. The step of folding the yarn 16 back on itself is repeated as indicated by arrow D in FIG. 3 and yarn 16 is then pinned immediately adjacent the first pin 14-B. In FIG. 4, this step has been repeated three times as indicated by arrow F forming loops 15-1, 15-2, and 15-3. Each looping operation causes the yarn to cover the heads of the pins so they will not be seen in the finished work.

Figure 5:
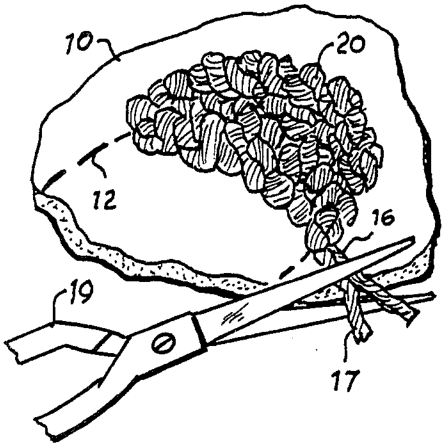
FIG. 5 is a perspective view of a portion of the panel of FIG. 1 in which part of the pattern has been covered by means of a single length of yarn and illustrating trimming of the ends thereof.

Turning to FIG. 5, a perspective view of the portion of substrate 10 is shown in which the entire length of yarn 16 has been pinned to substrate 10 in the manner just described forming a covered area 20. At this point, the ends 17 of yarn 16 are trimmed as close as possible to the last pin with scissors 18 or other convenient instrument. As may now be understood, another length of yellow yarn 16 is doubled, twisted and started at the end of the first length. In this manner, sufficient lengths are applied to the balance of the area 12 to cover it with the yellow yarn 16. This process is continued until all of the yellow areas of the design are covered.

Figure 6:
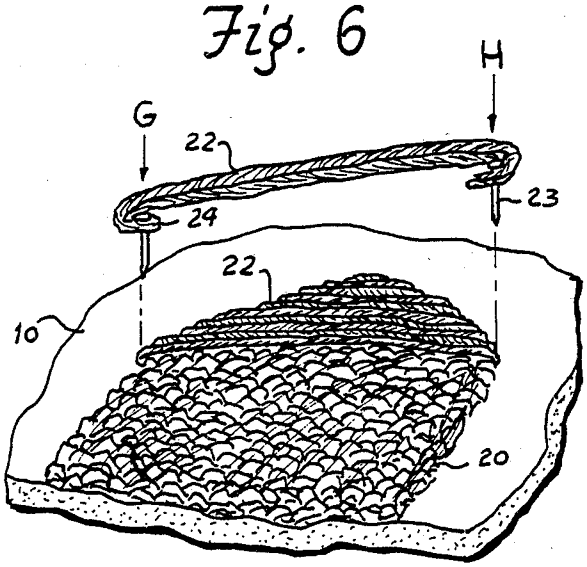
FIG. 6 is the portion of the panel shown in FIG. 5 having the pattern completely covered with a first layer of yarn and showing the method of starting a second layer of yarn which will produce a brush stroke texture.

The operator may continue then with the other elements of the picture until a first layer of yarn is in place over the entire design. As previously mentioned, I prefer to add a second layer of yarn to the first layers. Advantageously, this technique gives greater texture and depth to the finished picture and permits the use of a number of useful and attractive techniques that can add variety and texture to the picture. In many instances the second layer can be applied utilizing a twisted length of yarn as described for the first layer above which produces a carpet-like texture. An alternative texture which simulates brush strokes such as found in some oil paintings can be achieved by a technique illustrated in FIG. 6 in which a position of first layer 20 has been covered by parallel yarn strands 22; these strands are formed by a length of yarn selected of the desired color and folded back on itself as shown at 22. A pin 23 is pushed through both strands at the point of doubling and inserted through first layer 20 into substrate 10 as indicated by arrow E at the border of first layer 20. The two ends of yarn 20 are maintained parallel and a second pin 24 is inserted through both strands a distance from the folded end and pushed through first layer 20 into substrate 10 at the opposite border. The yarn 22 is then doubled back on itself and pinned adjacent first pin 23. This step is repeated until an entire second layer of yarn 22 is built up over first layer 20 a relatively thick layer. The general appearance of such area is indicated in the partial view of substrate 10 in FIG. 6. Under the control of the operator, the length of each pinned section of yarn 20 can be selected to simulate short or long brush strokes as desired. The granularity of the brush strokes can be controlled by how tightly the pinned sections of the yarn are to each other as will be apparent.

As may now be understood, the basic method of my painting with yarn invention has been described; namely, the use of lengths of yarn doubled back and twisted, the twisted yarn being pinned to the substrate at an appropriate spacing to permit covering of areas with the twisted yarn, building up of second layers of yarn over a first layer using either twisted yarn or straight, parallel strands of yarn. These basic steps may be varied to produce many interesting and attractive surface textures and patterns by the choice of the type of yarn, the directions of twisting and the treatment of the finished layers.

A wide variety of yarns are available on the market such as used for knitting, hooking rugs, applique work and the like. Thus, the operator may take advantage of this variety to achieve a number of striking effects. For example, what will be termed standard yarn is formed from four strands of wool or other material tightly twisted to form the yarn. Thus, the standard yarn is fairly tight and compact. Other yarns, referred to as bulkly yarns, may have four strands more loosely twisted to form a fluffy yarn. Particularly when forming the second layer of a work, the bulky yarn will produce a much looser and more bulky appearance than the standard yarn. Where areas to be covered are adjacent, interesting contrast and texture can be obtained when working with the length of yarn doubled and twisted if one area utilizes a clockwise twist of the yarn and an adjacent area utilizes a counterclockwise twist.

An additional variation can be achieved by the tightness or looseness of the twist of the yarn since this will effect the bulkiness or thickness of a layer. The following is a list of variations and steps that may be used in conjunction with my method to produce interesting and attractive patterns or textures:

1. Twisting standard yarn clockwise;
2. Twisting standard yarn counterclockwise;
3. Twisting bulky yarn clockwise;
4. Twisting bulky yarn counterclockwise;
5. Paralleling standard yarn;
6. Paralleling bulky yarn;
7. Twisting standard and/or bulky yarn using two different colors;
8. Brushing a layer of yarn formed from short lengths to produce a more fluffy surface;
9. Cutting or trimming brushed yarn to produce a fur effect; and
10. Pulling portions of a first layer through a second layer, especially when different colors are used.

Figure 7:
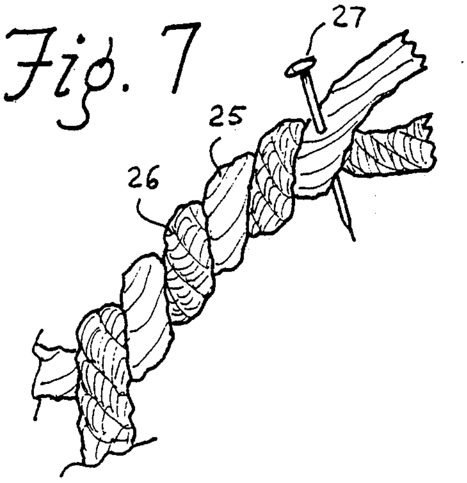
FIG. 7 is a partial view of a length of yarn in accordance with my method formed from twisting two different color strands of yarn together.

FIG. 7 illustrates the use of item 7 in which a twisted yarn is to be applied as previously described with reference to FIGS. 2 through 6. However, instead of having a single length of yarn which is doubled and twisted, two lengths of yarn 25 and 26 having different or contrasting oclors are twisted together. A pin 27 at the starting point is inserted through both lengths 25 and 26 and the loose ends closely trimmed. From that point the same technique as previously described for the twisted yarn is followed. The result is that the area covered will be comprised of two intermingled colors which may be contrasting or complementary. For example, a dark blue and a light blue yarn twisted as in FIG. 7 produces an area having two shades of the same color which would be a restful pattern, while a red and yellow yarn twisted together would produce a very bright, more exciting surface.

Figure 8:
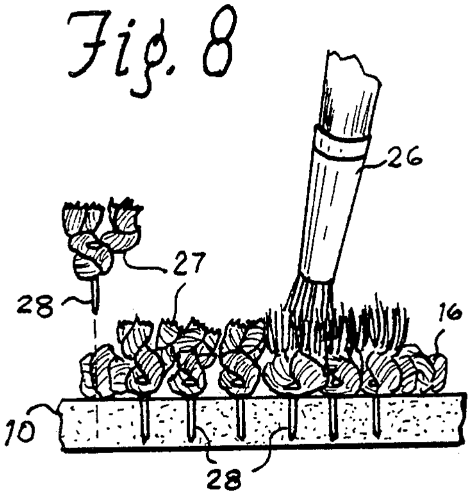
FIG. 8 illustrates, by a cross sectional view of a substrate, the brushing of a bulky yarn to produce a fluffy surface.
Figure 9:
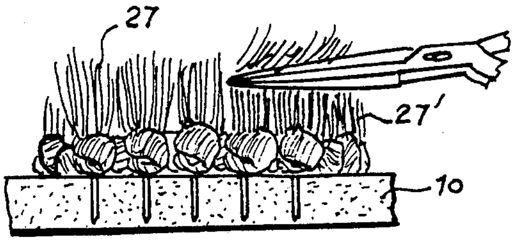
FIG. 9 illustrates trimming of the fluffed yarn of FIG. 8 to produce a fur-like surface.

Item 8 as illustrated in FIG. 8. Short lengths of yarn 27 are pinned through the first layer 16 to substrate 10 by pins 27. A short-bristled stiff brush 26 is brushed across the ends of yarn 27 which will cause the filaments in the yarn to stand up forming surface 29 which will have a very fluffy appearance. This technique is especially adaptable to use with the bulky type yarn. In a fur effect such as in yarn paintings of animals, the fluffed up yarn surface 29 may be trimmed with scissors to give a uniform fur appearance 27', as illustrated in FIG. 9.

Figure 10:
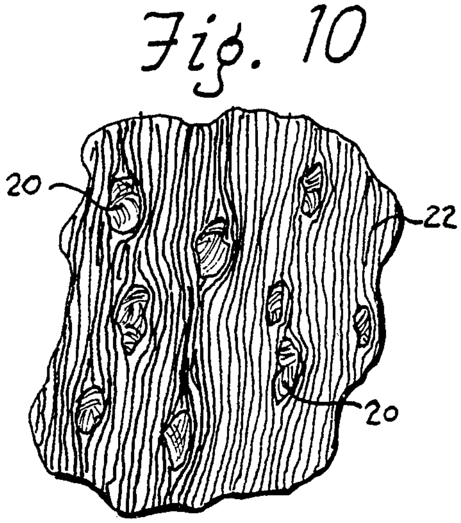
FIG. 10 shows a second layer of yarn over a first layer in which the first layer is of a different color than the second layer and portions of the first layer have been pulled through and cause to protrude through the second layer.

Item 10 is illustrated in FIG. 10. Here a first layer 20 has been produced and covered with a second layer 22. For purposes of illustration, layer 20 may be done in a dark brown or black color using twisted yarn, while top layer 22 is done with a tan or light brown yarn in parallel form to simulate a tree trunk. By using fingers or an embroidery hook or the like, the top yarn strands are opened slightly and yarn loops 20 forming the first layer are pulled through and permitted to project between the strands of the top yarn layer 22. As can be seen from the illustration, this produces contrasting dark areas interspersed among the lighter outer areas and will simulate tree bark in this example. The operator may recognize that this technique is usable for a number of different effects limited only by his or her imagination.

In addition to covering a relatively large surface of the design as indicated in the foregoing examples, lines may be formed in the design by a doubled and twisted length of yarn pinned to the substrate at short intervals without doubling the yarn back on itself. For example, a length of black yarn can outline a shape or create borders and the like.

As may now be recognized, I have disclosed a new method of making artistic pictures and designs with strands of yarn which have the appearance of a three dimensional painting. Through the use of several techniques, different surface textures are possible which add interest and variety to the yarn paintings. The technique is such that elderly and handicapped persons can easily carry it out since there are no tools or skills which need to be developed. Thus, my method is applicable both to producing attractive works of art and for use in therapy and recreational stemming from practicing the method. While I have described in some detail the method of looping lengths of yarn, pinning twisted and parallel strands of yarn to a yielding substrate by means of straight pins, and of working the surfaces of the yarn in various manners, it will be obvious to those of skill in the art to make other adaptations and variations in the handling of the yarn without departing from the spirit and scope of my invention.

I claim:

1. A method of producing artistic pictures and designs on a flat, yieldable substrate with elements of the pictures and designs formed from colored yarns comprising the steps of:

(a) doubling a first length of yarn of a selected type and color;
(b) inserting a straight pin through the yarn at the point of doubling;
(c) pressing the pin into the substrate at a selected starting point of the design;
(d) twisting the double ends of the first length of yarn;
(e) inserting a pin through the first twisted length of yarn at a point a short distance from the first pin;
(f) pinning the yarn with the second pin at a second point adjacent to the first pin to form an upward standing loop of twisted yarn;
(g) looping the twisted length of yarn back to a third point adjacent the first pin;
(h) pinning the yarn at the third point thereby forming an upward standing loop contiguous with the first upward standing loop;
(i) continuing the steps of (g) and (h) for successive points so as to completely cover a first area of the design with a first layer of contiguous upward standing loops of twisted yarn; and
(j) repeating steps (a) through (i) for each additional area of the design thereby forming a first layer of looped yarn over each area of the design.

2. The method as defined in claim 1 which further comprises the steps of:

(k) doubling a second length of yarn of a selected type and color;
(l) inserting a straight pin through the second length of yarn at the point of doubling;
(m) pressing the starting pin into the substrate along a border of a first layer of yarn;
(n) maintaining the doubled strands of the second length of yarn essentially parallel;
(o) pinning the double strands of parallel yarn to the substrate across the first layer to another point on the border of the first layer area;
(p) doubling the parallel strands back to a point on the border adjacent the starting pin;
(q) pinning the parallel strands of the second length of yarn to the substrate immediately adjacent the starting pin; and
(r) repeating steps (n) through (q) until a second layer of the double parallel strands of yarn is formed covering at least part of the first layer thereby forming a three dimensional brush stroke effect.

3. The method as defined in claim 2 in which the color of the second length of yarn is selected to complement the color of the first layer being covered therewith.

4. The method as defined in claim 2 in which the color of the second length of yarn is selected to contrast with the color of the first layer being covered therewith.

5. The method as defined in claim 1 in which the length of yarn in adjacent areas have different directions of twist.

6. The method as defined in claim 1 in which the yarn for at least one area is selected to be a tight standard yarn and the yarn selected for at least one other area is a loose, bulky yarn.

7. The method as defined in claim 1 in which the twisted yarn in at least one area is formed from two lengths of yarn of different colors.

8. The method as defined in claim 1 in which at least one area is covered by the steps of:

(s) cutting a short length of yarn;

(t) doubling and twisting the short length of yarn;

(u) pinning the short length of yarn to the substrate in an area at the point of doubling thereby forming two upstanding yarn ends;

(v) repeating steps (s) through (u) until a selected area is covered; and (w) brushing the surface of the area with a short stiff brush to separate filaments of the upstanding yarn ends to thereby form a non-uniform fluffy surface.

9. The method as defined in claim 8 in which the non-uniform fluffy surface is trimmed to form a uniform fur-like surface.

10. The method as defined in claim 2 which further comprises the step of pulling loops from the first layer upward and through the parallel strands of yarn of the second layer to provide small areas of the colors of the first layer within the colors of the second layer.

11. A method a yarn painting of a design on a yieldable substrate comprising the steps of:

(a) covering areas of the design with twisted yarn by (i) twisting doubled lengths of yarn, and (ii) forming short upstanding loops by pinning short sections of the twisted doubled yarn to the substrates with the loops contiguous over an area thereby forming a three dimensional area;

(b) selecting colors of yarn for each area in accordance with the design; and (c) selecting the type of yarn for each area in accordance with the desired texture.

* * * * *